United States Patent
Kelly et al.

(10) Patent No.: US 11,102,162 B2
(45) Date of Patent: Aug. 24, 2021

(54) SYSTEMS AND METHODS OF FACILITATING LIVE STREAMING OF CONTENT ON MULTIPLE SOCIAL MEDIA PLATFORMS

(71) Applicant: Halo Innovative Solutions LLC, Stone Mountain, GA (US)

(72) Inventors: Casey Teddell Kelly, Stone Mountain, GA (US); Kirk Brown, Stone Mountain, GA (US)

(73) Assignee: HALO INNOVATIVE SOLUTIONS LLC, Stone Mountain, GA (US)

( * ) Notice: Subject to any disclaimer, the term of this patent is extended or adjusted under 35 U.S.C. 154(b) by 0 days.

(21) Appl. No.: 16/909,694

(22) Filed: Jun. 23, 2020

(65) Prior Publication Data

US 2020/0382570 A1   Dec. 3, 2020

Related U.S. Application Data

(63) Continuation of application No. 16/908,665, filed on Jun. 22, 2020, now abandoned, which is a continuation-in-part of application No. 16/232,818, filed on Dec. 26, 2018, now Pat. No. 10,693,830, application No. 16/909,694, which is a
(Continued)

(51) Int. Cl.
*H04L 12/58* (2006.01)
*H04L 29/06* (2006.01)
*H04L 29/08* (2006.01)

(52) U.S. Cl.
CPC .............. *H04L 51/32* (2013.01); *H04L 51/10* (2013.01); *H04L 63/08* (2013.01); *H04L 65/4076* (2013.01); *H04L 65/602* (2013.01); *H04L 65/607* (2013.01); *H04L 67/06* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 7,724,284 B2 | 5/2010 | Mentzer | |
| 8,451,994 B2 | 5/2013 | Abuan et al. | |
| 10,179,543 B2 | 1/2019 | Rathi et al. | |

(Continued)

FOREIGN PATENT DOCUMENTS

| | | |
|---|---|---|
| JP | 5200446 B2 | 4/2008 |
| KR | 20020049391 A | 6/2002 |

*Primary Examiner* — Angela Nguyen (57) ABSTRACT

Disclosed herein is a method of facilitating live streaming of content on multiple social media platforms. The method comprises receiving a digital content from a source user device, receiving a supplemental content identifier from the source user device, receiving multiple target identifiers from the source user device, identifying multiple social media servers associated with the multiple target identifiers, identifying a supplemental content based on the supplemental content identifier, processing the digital content based on multiple platform characteristics corresponding to the multiple social media servers, embedding the supplemental content in the digital content, generating multiple digital content based on the processing, and transmitting the multiple digital content to the multiple social media servers.

30 Claims, 6 Drawing Sheets

Related U.S. Application Data continuation-in-part of application No. 16/232,818, filed on Dec. 26, 2018, now Pat. No. 10,693,830.

(60) Provisional application No. 62/577,698, filed on Oct. 26, 2017.

(56) References Cited

U.S. PATENT DOCUMENTS

| | | |
|---|---|---|
| 10,397,013 B1* | 8/2019 | Hill ................. H04L 67/306 |
| 2006/0139463 A1 | 6/2006 | Heinonen |
| 2010/0311347 A1* | 12/2010 | Le Thierry D'Ennequin .............. H04N 5/232 |
| | | 455/67.11 |
| 2016/0316340 A1* | 10/2016 | Zhao .................. H04W 4/60 |
| 2018/0077356 A1* | 3/2018 | Zilberman ......... H04N 5/23222 |
| 2019/0132275 A1* | 5/2019 | Kelly ................. H04L 51/32 |

* cited by examiner

SYSTEMS AND METHODS OF FACILITATING LIVE STREAMING OF CONTENT ON MULTIPLE SOCIAL MEDIA PLATFORMS

TECHNICAL FIELD

Generally, the present disclosure relates to the field of data processing. More specifically, the present disclosure relates to systems and methods of facilitating live streaming of content on multiple social media platforms.

BACKGROUND

Existing techniques for posting (and/or live streaming) content (such as pictures or videos) on social media platforms are deficient with regard to several aspects. For instance, current technologies do not allow the user to post (such as provide live streaming of videos) on more than one platform at the same time. Furthermore, current technologies do not allow user to select individuals (such as followers on Facebook™, Instagram™, or Twitter™ etc.) with whom the user may want to share the live stream video irrespective of the social media platform on which the individual may be present. Furthermore, the currently technologies do not allow user to select the individuals based on the location of the user with whom the user may want to share the live stream video.

Therefore, there is a need for improved systems and methods of facilitating live streaming of content on multiple social media platform that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating live streaming of content on multiple social media platforms. The method may include receiving, using a communication device, a digital content from a source user device. Further, the source user device may include at least one content capturing device configured for generating the digital content. Further, the method may include receiving, using the communication device, a supplemental content identifier from the source user device. Further, the method may include receiving, using the communication device, a plurality of target identifiers from the source user device. Further, the plurality of target identifiers may correspond to a plurality of target user devices. Further, the plurality of target identifiers may include at least one location indicator. Further, the method may include identifying, using a processing device, a plurality of social media servers associated with the plurality of target identifiers. Further, the method may include identifying, using the processing device, a supplemental content based on the supplemental content identifier. Further, the supplemental content may include at least one of a background audio content, a visual content, an audio-visual content, a textual content, and a haptic content. Further, the method may include processing, using the processing device, the digital content based on a plurality of platform characteristics corresponding to the plurality of social media servers. Further, the method may include embedding, using the processing device, the supplemental content in the digital content. Further, the method may include generating, using the processing device, a plurality of digital content based on the processing. Further, the method may include transmitting, using the communication device, the plurality of digital content to the plurality of social media servers.

According to some embodiments, a system of facilitating live streaming of content on multiple social media platforms is disclosed. The system may include a communication device configured for receiving a digital content from a source user device. Further, the source user device may include at least one content capturing device configured for generating the digital content. Further, the communication device may be configured for receiving a supplemental content identifier from the source user device. Further, the communication device may be configured for receiving a plurality of target identifiers from the source user device. Further, the plurality of target identifiers may correspond to a plurality of target user devices. Further, the plurality of target identifiers may include at least one location indicator. Further, the communication device may be configured for transmitting a plurality of digital content to a plurality of social media servers. Further, the system may include a processing device configured for identifying the plurality of social media servers associated with the plurality of target identifiers. Further, the processing device may be configured for identifying a supplemental content based on the supplemental content identifier. Further, the supplemental content may include at least one of a background audio content, a visual content, an audio-visual content, a textual content, and a haptic content. Further, the processing device may be configured for processing the digital content based on a plurality of platform characteristics corresponding to the plurality of social media servers. Further, the processing device may be configured for embedding the supplemental content in the digital content. Further, the processing device may be configured for generating the plurality of digital content based on the processing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for facilitating live streaming of content on multiple social media platforms, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a smart television, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network.

Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, a GLONASS-K2 receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes systems and methods for providing an effective platform for broadcasting, multicasting, simulcasting, geocasting, etc., which embodies the simultaneous delivery of content using plurality of live stream social platform identifier to plurality of geographical destinations. This describes simultaneously casting in any form for live streaming using a plurality of social identifiers through any computing process. Further, the present disclosure provide live stream on social platforms using a plurality of identifiers.

Figure 1:
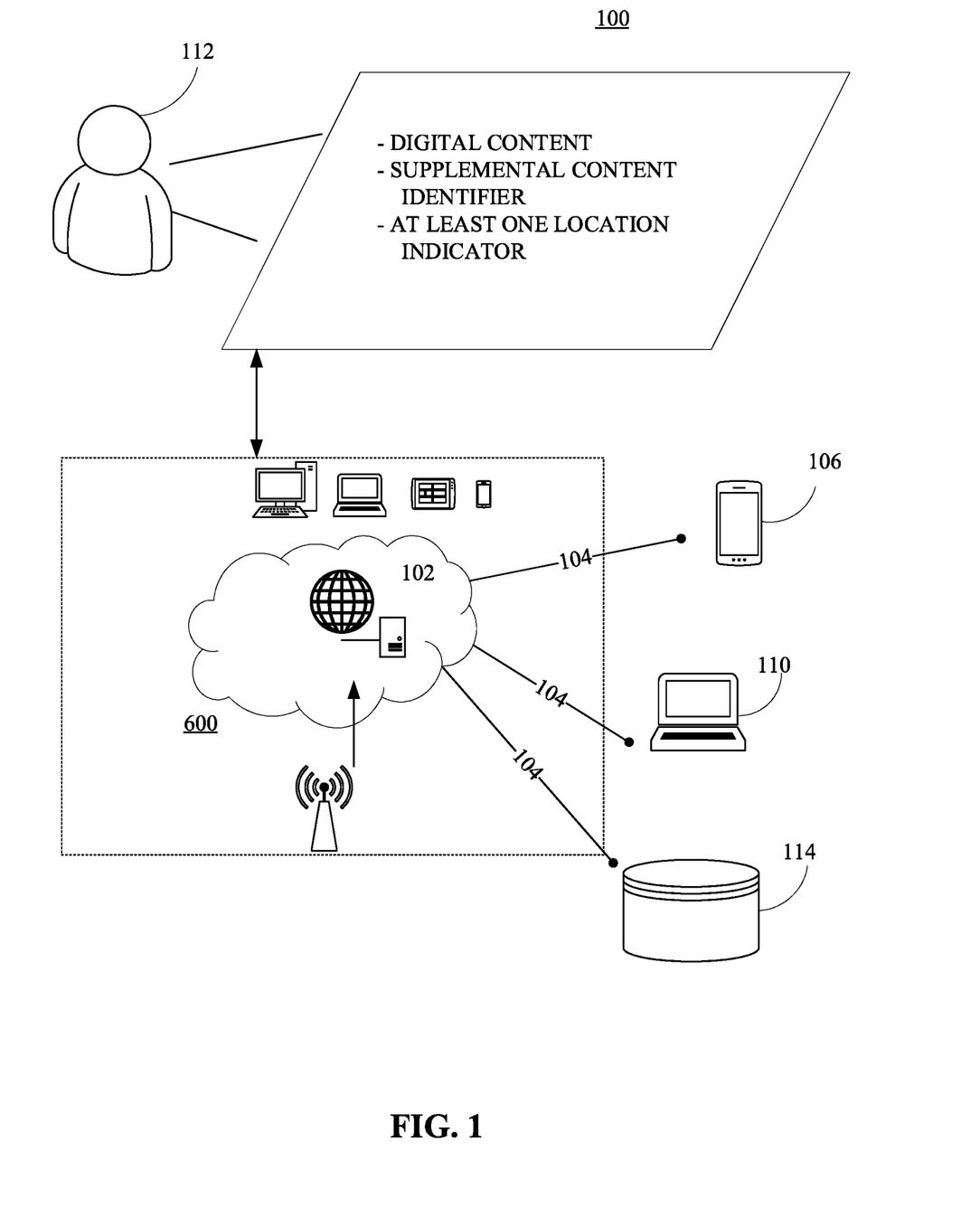
FIG. 1 is an illustration of an online platform consistent with various embodiments of the present disclosure.

Referring now to figures, FIG. 1 is an illustration of an online platform 100 consistent with various embodiments of the present disclosure. By way of non-limiting example, the online platform 100 to facilitate live streaming of content on multiple social media platforms may be hosted on a centralized server 102, such as, for example, a cloud computing service. The centralized server 102 may communicate with other network entities, such as, for example, a mobile device 106 (such as a smartphone, a laptop, a tablet computer, a smart television, etc.), other electronic devices 110 (such as desktop computers, server computers, etc.), and databases 114 over a communication network 104, such as, but not limited to, the Internet. Further, users of the online platform 100 may include relevant parties such as, but not limited to, end-users, users, administrators, service providers, service consumers and so on. Accordingly, in some instances, electronic devices operated by the one or more relevant parties may be in communication with the platform 100.

A user 112, such as the one or more relevant parties, may access online platform 100 through a web-based software application or browser. The web-based software application may be embodied as, for example, but not be limited to, a website, a web application, a desktop application, and a mobile application compatible with a computing device 600.

Figure 2:
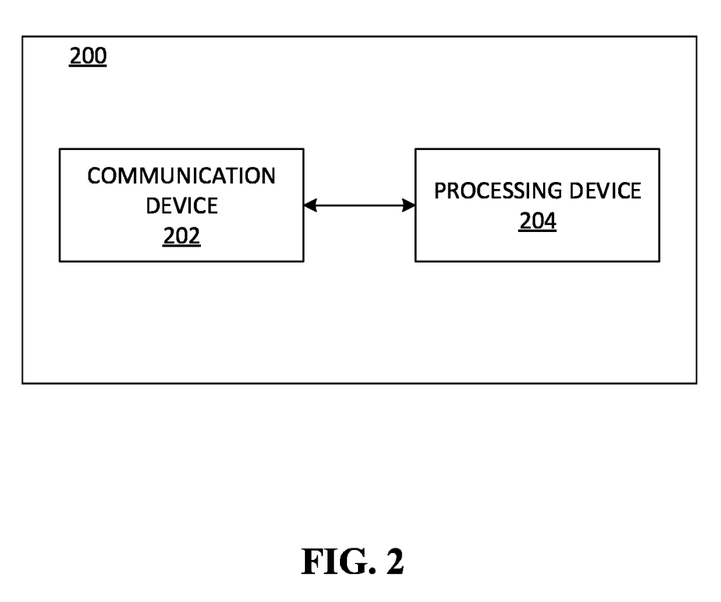
FIG. 2 is a block diagram of a system of facilitating live streaming of content on multiple social media platforms, in accordance with some embodiments.

FIG. 2 is a block diagram of a system 200 of facilitating live streaming of content on multiple social media platforms, in accordance with some embodiments. Accordingly, the system 200 may include a communication device 202 and a processing device 204. Further, the communication device 202 configured for receiving a digital content from a source user device (such as the mobile device 106, the electronic devices 110, etc.). Further, the source user device may include at least one content capturing device configured for generating the digital content. Further, the digital content, in an instance, may be any content in a digital form that the user (such as the user 112) may wish to use for the posting on the multiple social media platforms. For example, the digital content may include at least one of an audio content, a video content, an audio-video content, a textual content, and a haptic content and/or ultra-haptic content. Accordingly, in an instance, the ultra-haptic content may simulate a feeling of touch using, for example, acoustic energy. In some embodiments, the at least one content capturing device may include a plurality of cameras. Further, the plurality of cameras may include a front camera and a rear camera. Further, each of the front camera and the rear camera is configured to capture content simultaneously.

Further, the communication device 202 may be configured for receiving a supplemental content identifier from the source user device.

Further, the communication device 202 may be configured for receiving a plurality of target identifiers from the source user device. Further, the plurality of target identifiers may correspond to a plurality of target user devices (such as the mobile device 106, the electronic devices 110, etc.). Further, the target user devices, in an instance, may be devices associated with a target audience. The target audience, in an instance, may be a group of users (and/or consumers) at which the digital content (such as the live digital content) may be aimed. Further, the plurality of target identifiers may include at least one location indicator. In some embodiments, the at least one location indicator is related to at least one location. Further, the at least one location may include at least one geographical location of the plurality of target user devices. Further, the at least one geographical location comprises at least one geographical area. Further, the at least one geographical area may include at least one continent, at least one country associated with the at least one continent, at least one state associated with the at least one country, at least one city associated with the at least one state, etc. Further, the at least one geographical area may be defined by an arbitrary geographical boundary.

In some embodiments, the plurality of target identifiers may include a plurality of social media platform identifiers corresponding to a plurality of social media platforms. Further, a first target user device of the plurality of target user devices may be associated with a first social media platform of the plurality of social media platforms. Further, a second target user device of the plurality of target user devices may be associated with a second social media platform of the plurality of social media platforms.

In some embodiments, the plurality of target identifiers may include a plurality of user identifiers associated with a plurality of social media platforms. Further, a first user identifier of the plurality of user identifiers may be associated with a first social media platform of the plurality of social media platforms. Further, a second user identifier of the plurality of user identifiers may be associated with a second social media platform of the plurality of social media platforms.

Further, the communication device 202 may be configured for transmitting a plurality of digital content to a plurality of social media servers (such as the centralized server 102).

Further, the processing device 204 may be configured for identifying the plurality of social media servers associated with the plurality of target identifiers. Further, the identifying of the social media servers is associated with the at least one location indicator.

Further, the processing device 204 may be configured for identifying a supplemental content based on the supplemental content identifier. Further, the supplemental content may include at least one of a background audio content, a visual content, an audio-visual content, a textual content, and a haptic content and/or ultra-haptic content. Accordingly, in an instance, the ultra-haptic content may simulate a feeling of touch using, for example, acoustic energy. Further, the background audio content comprises at least one aurally consumable content. Further, the at least one aurally consumable content may include at least one of a music content and a voice content. Further, the visual content may include at least one visually consumable content, wherein the at least one visually consumable content comprises a multidimensional image.

Further, the processing device 204 may be configured for processing the digital content based on a plurality of platform characteristics corresponding to the plurality of social media servers.

In some embodiments, the plurality of platform characteristics may include a plurality of content formats. Further, the processing may include transforming the digital content into the plurality of digital content based on the plurality of content formats.

Further, the processing device 204 may be configured for embedding the supplemental content in the digital content. Further, the processing device 204 may be configured for generating the plurality of digital content based on the processing.

In further embodiments, the processing device 204 may be further configured for analyzing the digital content and determining the at least one location indicator based on the analyzing.

In further embodiments, the communication device 202 may be further configured for receiving a plurality of user feedback from the plurality of target user devices. Further, the communication device 202 may be configured for transmitting an integrated user feedback to the source user device. Further, the source user device may be configured for presenting the integrated user feedback. Further, the processing device may be configured for generating the integrated user feedback based on the plurality of user feedback.

In further embodiments, the at least one content capturing device may include the plurality of cameras. Further, the plurality of cameras detachably couplable to the device.

In further embodiments, a plurality of notifications may be transmitted to the plurality of social media servers based on the receiving of the digital content from the source user device.

In further embodiments, the embedding may include adding the supplemental content to the plurality of digital content. Further, the supplemental content may include a visual content. Further, in an instance, the visual content may include at least one watermark. Further, in an instance, the supplemental content may include the textual content. Further, the textual content may include a translation of the plurality of digital content. Further, in an instance, the supplemental content may include the background audio content. Further, the background audio content may include a voiceover of the plurality of digital content.

Further, in some embodiments, the processing device may be configured for embedding the supplement content in the plurality of digital content based on the generating of the plurality of digital content. Further, the supplemental content may be directly embedded to the plurality of digital content.

Further, in an embodiment, the embedding of the supplemental content in the digital content may be prior to the processing of the digital content.

Further, in an embodiment, the system 200 facilitates the live streaming of the content on multiple social media platforms using a web-based software application or browser. Further, the web-based software application may include a website, a web application, a desktop application, a mobile application, etc. Further, the system 200 may execute the web-based software application for facilitating the live streaming of the content on multiple social media platforms.

Further, in an embodiment, the source user device and the plurality of target user devices may execute the web-based software application.

Figure 3:
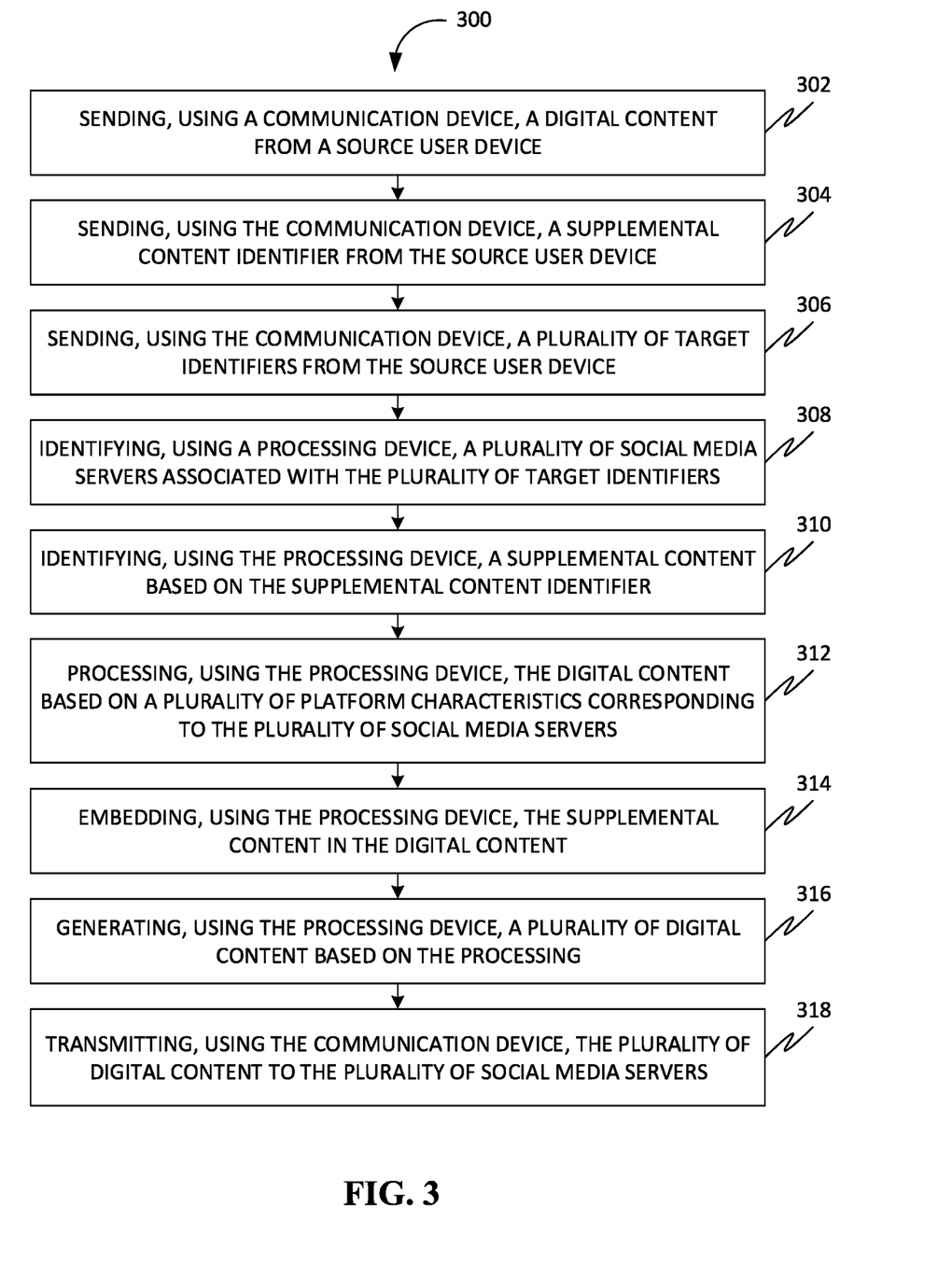
FIG. 3 is a flowchart of a method of facilitating live streaming of content on multiple social media platforms, in accordance with some embodiments.

FIG. 3 is a flowchart of a method 300 of facilitating live streaming of content on multiple social media platforms, in accordance with some embodiments. Accordingly, at 302, the method 300 may include receiving, using a communication device, a digital content from a source user device (such as the mobile device 106, the electronic devices 110, etc.). Further, the source user device may include at least one content capturing device configured for generating the digital content. Further, the digital content, in an instance, may be any content in a digital form that the user (such as the user 112) may wish to use for the posting on the multiple social media platforms.

In some embodiments, the at least one content capturing device may include a plurality of cameras. Further, the plurality of cameras may include a front camera and a rear camera. Further, each of the front camera and the rear camera is configured to capture content simultaneously. Accordingly, based on an input to capture content, both the front camera and the rear camera may be activated simultaneously and content may be captured synchronously. Accordingly, in an instance, the digital content may include a first image captured using the front camera and a second image captured using the rear camera. Further, the first image and the second image may be captured at the same time instant.

In further embodiments, the at least one content capturing device may include the plurality of cameras. Further, the plurality of cameras detachably couplable to the device.

Further, at 304, the method may include receiving, using the communication device, a supplemental content identifier from the source user device.

Further, at 306, the method may include receiving, using the communication device, a plurality of target identifiers from the source user device. Further, the plurality of target identifiers may correspond to a plurality of target user devices (such as the mobile device 106, the electronic devices 110, etc.). Further, the plurality of target identifiers may include at least one location indicator. Further, the at least one location indicator may be related to at least one location. Further, the at least one location comprises at least one geographical location of the plurality of target user devices. Further, the target user devices, in an instance, may be devices associated with a target audience. The target audience, in an instance, may be a group of users (and/or consumers) at which the digital content (such as the live digital content) may be aimed.

In some embodiments, the plurality of target identifiers may include a plurality of social media platform identifiers corresponding to a plurality of social media platforms.

Further, a first target user device of the plurality of target user devices may be associated with a first social media platform of the plurality of social media platforms. Further, a second target user device of the plurality of target user devices may be associated with a second social media platform of the plurality of social media platforms.

In some embodiments, the plurality of target identifiers may include a plurality of user identifiers associated with a plurality of social media platforms. Further, a first user identifier of the plurality of user identifiers may be associated with a first social media platform of the plurality of social media platforms. Further, a second user identifier of the plurality of user identifiers may be associated with a second social media platform of the plurality of social media platforms.

Further, at 308, the method may include identifying, using a processing device, a plurality of social media servers associated with the plurality of target identifiers.

Accordingly, in some embodiments, the method may include, receiving a plurality of selections corresponding to the plurality of social media servers. For example, the user may be presented with a collection of social media platform indicators. Accordingly, the user may select a plurality of social media platform indicators corresponding to the plurality of social media platforms. Further, the user may select the first social media platform as a primary social media platform and link one or more secondary social media platforms to the primary social media platform. Accordingly, in this instance, the user may perform live streaming of the digital content using a graphical user interface of the primary social media platform and the digital content may be live streamed to users of both the primary social media platform and the one or more secondary social media platforms.

Further, in some embodiments, the method may include, performing a plurality of authentications with the plurality of social media servers in order to facilitate live streaming of the digital content. Accordingly, the method may include transmitting, using the communication device, a plurality of credentials of the user to the plurality of social media servers. In an instance, the plurality of credentials may be centrally stored and managed by one or more of the plurality of social media platforms and/or a multi-platform, multi-streaming service provider (e.g. Halo Live™). Further, the method may include authenticating, using the processing device, the user with the plurality of social media servers based on the plurality of credentials. For instance, when the user selects a social media platform of the plurality of social media platforms, credentials of the user associated with the social media platform may be transmitted to the social media server associated with the social media platform. Accordingly, the social media server may authenticate the user based on the credential and allow access to the social connections of the user and also permit communication with the social connections, including live streaming of the digital content. Additionally, in some embodiments, when the user links the primary social media platform with the one or more secondary social media platforms, the method may include authenticating the user on each of the one or more secondary social media platforms through the primary social media platform. In other words, the user may provide credentials associated with the one or more secondary social media platforms through a graphical user interface of the primary social media platform. Subsequently, based on the credentials the linking of the primary social media platform with the one or more secondary social media platforms may be completed.

Further, at 310, the method may include identifying, using the processing device, a supplemental content based on the supplemental content identifier. Further, the supplemental content may include at least one of a background audio content, a visual content, an audio-visual content, a textual content, and a haptic content. Further, the background audio content may include at least one aurally consumable content. Further, the at least one aurally consumable content may include at least one of a music content and a voice content. Further, the visual content may include at least one visually consumable content. Further, the at least one visually consumable content may include a multidimensional image, such as but not limited to, a 2D image, a 3D image, a 4D image, a 5D image, a 6D image and a 7D image. Further, the multidimensional image include at least two spatial dimensions. Additionally, in some instances, the multidimensional image may include at least one time dimension. For example, the 4D image may include three spatial dimensions and one time dimension resulting an animated 3D image.

Further, at 312, the method may include processing, using the processing device, the digital content based on a plurality of platform characteristics corresponding to the plurality of social media servers.

In some embodiments, the plurality of platform characteristics may include a plurality of content formats. Further, the processing may include transforming the digital content into the plurality of digital content based on the plurality of content formats. In general, a content format may encapsulate any characteristic of the digital content that may correspond to a particular social media platform. For example, the content format may include file type, aspect ratio, encoding/decoding type, encryption type, fidelity level, spatial resolution, temporal resolution, and so on.

Further, at 314, the method may include embedding, using the processing device, the supplemental content in the digital content.

In further embodiments, the embedding may include adding the supplemental content to the plurality of digital content. Further, the supplemental content may include a visual content. Further, in an instance, the visual content may include at least one watermark. Further, in an instance, the supplemental content may include the textual content. Further, the textual content may include a translation of the plurality of digital content. Further, in an instance, the supplemental content may include the background audio content. Further, the background audio content may include a voiceover of the plurality of digital content.

Further, in an embodiment, the embedding of the supplemental content in the digital content may be prior to the processing of the digital content.

In further embodiments, the method may include embedding, using the processing device, the supplemental content in the plurality of digital content based on the generating of the plurality of digital content. Further, the supplemental content may be directly embedded to the plurality of digital content.

Further, at 316, the method may include generating, using the processing device, a plurality of digital content based on the processing.

Further, at 318, the method may include transmitting, using the communication device, the plurality of digital content to the plurality of social media servers.

In an instance, the method 300 of facilitating live streaming of content on multiple social media platforms may be used for video game live streaming, live streaming of a podcast, webinar, live news broadcast, and social environment and so on. Accordingly, the digital content from the source user device, such as a smartphone 106, may include an audio and/or a video stream of the user. For instance, the digital content may include an audio and/or video stream of the user providing a commentary on a video game. Further, the supplemental content may include video game content (video, and optionally audio). Accordingly, the supplemental content identifier may include an identifier (e.g. a network address, a device identifier, etc.) of an electronic device, such as, for example, a game console, configured for generating the video game content. Accordingly, the video game content may be embedded in the audio and/or video stream of the user.

In further embodiments, a plurality of notifications may be transmitted to the plurality of social media servers based on the receiving of the digital content from the source user device.

Further, in an embodiment, the method 300 facilitates the live streaming of the content on multiple social media platforms using a web-based software application or browser. Further, the web-based software application may include a website, a web application, a desktop application, a mobile application, etc. Further, the method 300 may use the web-based software application for performing one or more steps of the method 300.

Further, in an embodiment, the source user device and the plurality of target user devices may execute the web-based software application.

Figure 4:
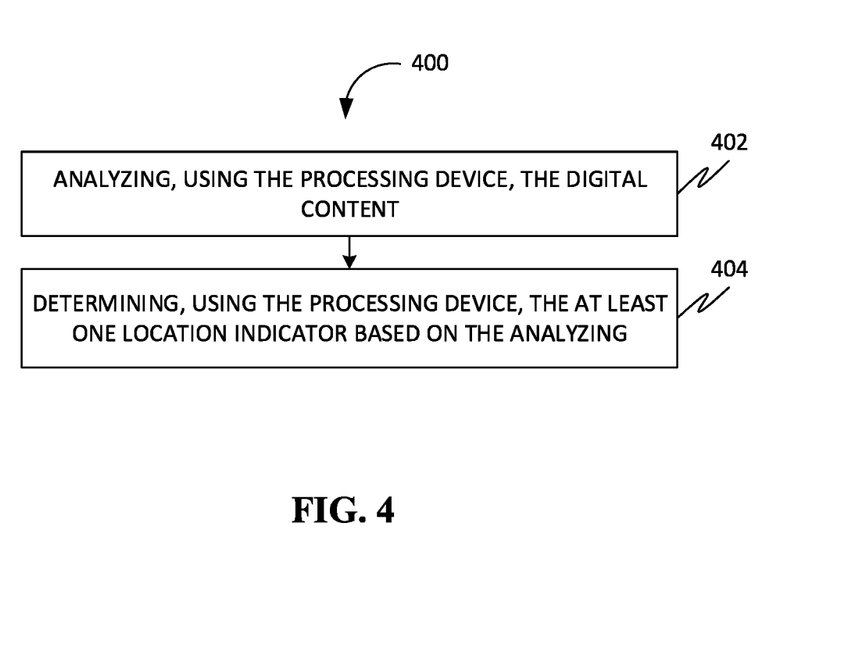
FIG. 4 is a flowchart of a method of ascertaining at least one location indicator, in accordance with some embodiments.

FIG. 4 is a flowchart of a method 400 of ascertaining at least one location indicator, in accordance with some embodiments. Accordingly, at 402, the method 400 may include analyzing, using the processing device, the digital content.

Further, at 404, the method 400 may include determining, using the processing device, the at least one location indicator based on the analyzing. Further, the receiving of the plurality of target identifiers from the source user device may include the receiving of the at least one location indicator based on the determining. Further, the at least one location indicator may correspond to the plurality of target user devices.

Figure 5:
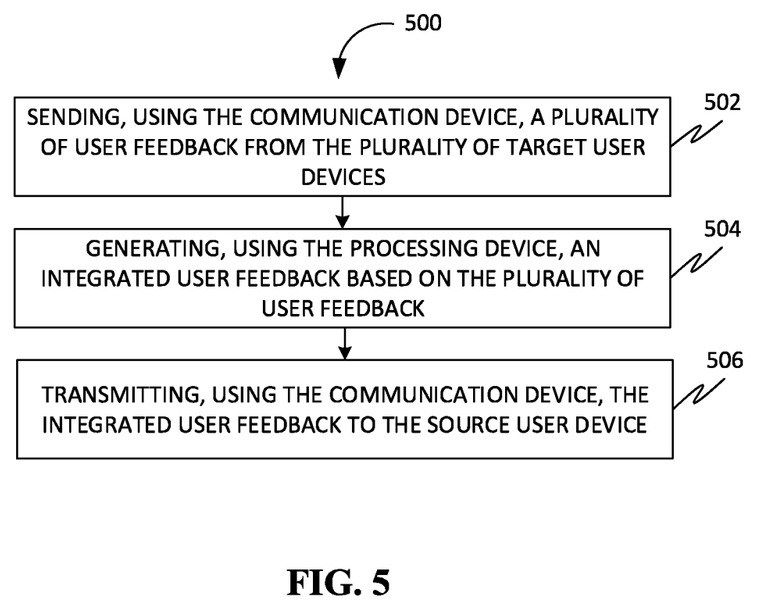
FIG. 5 is a flowchart of a method of dispatching an integrated user feedback based on the plurality of user feedback, in accordance with some embodiments.

FIG. 5 is a flowchart of a method 500 of dispatching an integrated user feedback based on the plurality of user feedback, in accordance with some embodiments. Accordingly, at 502, the method 500 may include receiving, using the communication device, a plurality of user feedback from the plurality of target user devices. Further, the plurality of user feedback may be associated with the plurality of digital content.

Further, at 504, the method 500 may include generating, using the processing device, the integrated user feedback.

Further, at 506, the method 500 may include transmitting, using the communication device, the integrated user feedback to the source user device. Further, the source user device may be configured for presenting the integrated user feedback.

According to some embodiments, a device for facilitating live streaming of content on multiple social media platforms is disclosed. Further, the device may include at least one content capturing device, a communication device, and a processing device.

Further, the at least one content capturing device may be configured for generating the digital content.

Further, the communication device may be configured for transmitting a plurality of digital content to a plurality of social media servers.

Further, the processing device may be communicatively coupled with the at least one content capturing device and the communication device. Further, the processing device may be configured for identifying the plurality of social media servers associated with a plurality of target identifiers. Further, the plurality of target identifiers corresponds to a plurality of target user devices. Further, the plurality of target identifiers may include at least one location indicator. Further, the processing device may be configured for identifying a supplemental content based on a supplemental content identifier. Further, the supplemental content may include at least one of a background audio content, a visual content, an audio-visual content, a textual content, and a haptic content. Further, the processing device may be configured for processing the digital content based on a plurality of platform characteristics corresponding to the plurality of social media servers. Further, the processing device may be configured for embedding the supplemental content in the plurality of digital content. Further, the processing device may be configured for generating the plurality of digital content based on the processing.

Further, in some embodiments, the processing device may be configured for embedding the supplemental content in the digital content. Further, the supplemental content may be embedded in the digital content prior to the processing of the digital content.

Further, in an embodiment, the embedding of the supplement content in the plurality of digital content may be based on the generating of the plurality of digital content. Further, the supplemental content may be directly embedded to the plurality of digital content.

Further, in some embodiments, the at least one location indicator may be related to at least one location. Further, the at least one location may include at least one geographical location of the plurality of target user devices. Further, the at least one geographical location may include at least one geographical area.

Further, in some embodiments, the visual content may include at least one visually consumable content. Further, the at least one visually consumable content may include a multidimensional image.

Further, in some embodiments, the background audio content may include at least one aurally consumable content. Further, the at least one aurally consumable content may include at least one of a music content and a voice content.

Further, in some embodiments, the plurality of target identifiers may include a plurality of social media platform identifiers corresponding to a plurality of social media platforms. Further, a first target user device of the plurality of target user devices may be associated with a first social media platform of the plurality of social media platforms. Further, a second target user device of the plurality of target user devices may be associated with a second social media platform of the plurality of social media platforms.

Further, in some embodiments, the plurality of target identifiers may include a plurality of user identifiers associated with a plurality of social media platforms. Further, a first user identifier of the plurality of user identifiers may be associated with a first social media platform of the plurality of social media platforms. Further, a second user identifier of the plurality of user identifiers may be associated with a second social media platform of the plurality of social media platforms.

Further, in some embodiments, the processing device may be configured for analyzing the digital content. Further, the processing device may be configured for determining the at least one location indicator based on the analyzing.

Further, in some embodiments, the plurality of platform characteristics may include a plurality of content formats.

Further, the processing may include transforming the digital content into the plurality of digital content based on the plurality of content formats.

Further, in some embodiments, the processing device may be configured for generating an integrated user feedback based on a plurality of user feedback. Further, the device may be configured for presenting the integrated user feedback.

Further, in some embodiments, the at least one content capturing device may include a plurality of cameras. Further, the plurality of cameras may include a front camera and a rear camera. Further, each of the front camera and the rear camera may be configured to capture content simultaneously.

Further, in some embodiments, the processing device may be configured for authenticating the user with the plurality of social media servers based on a plurality of credentials of the user.

Further, in some embodiments, the at least one content capturing device may be detachably couplable to the device.

In further embodiments, the at least one content capturing device may include the plurality of cameras. Further, the plurality of cameras detachably couplable to the device.

In further embodiments, a plurality of notifications may be transmitted to the plurality of social media servers based on the generating of the digital content.

In further embodiments, the embedding may include adding the supplemental content to the plurality of digital content. Further, the supplemental content may include a visual content. Further, in an instance, the visual content may include at least one watermark. Further, in an instance, the supplemental content may include the textual content. Further, the textual content may include a translation of the plurality of digital content. Further, in an instance, the supplemental content may include the background audio content. Further, the background audio content may include a voiceover of the plurality of digital content.

Further, in an embodiment, the device facilitates the live streaming of the content on multiple social media platforms using a web-based software application or browser. Further, the web-based software application may include a website, a web application, a desktop application, a mobile application, etc. Further, the device may execute the web-based software application for facilitating the live streaming of the content on multiple social media platforms.

Further, in an embodiment, the source user device and the plurality of target user devices may execute the web-based software application.

Figure 6:
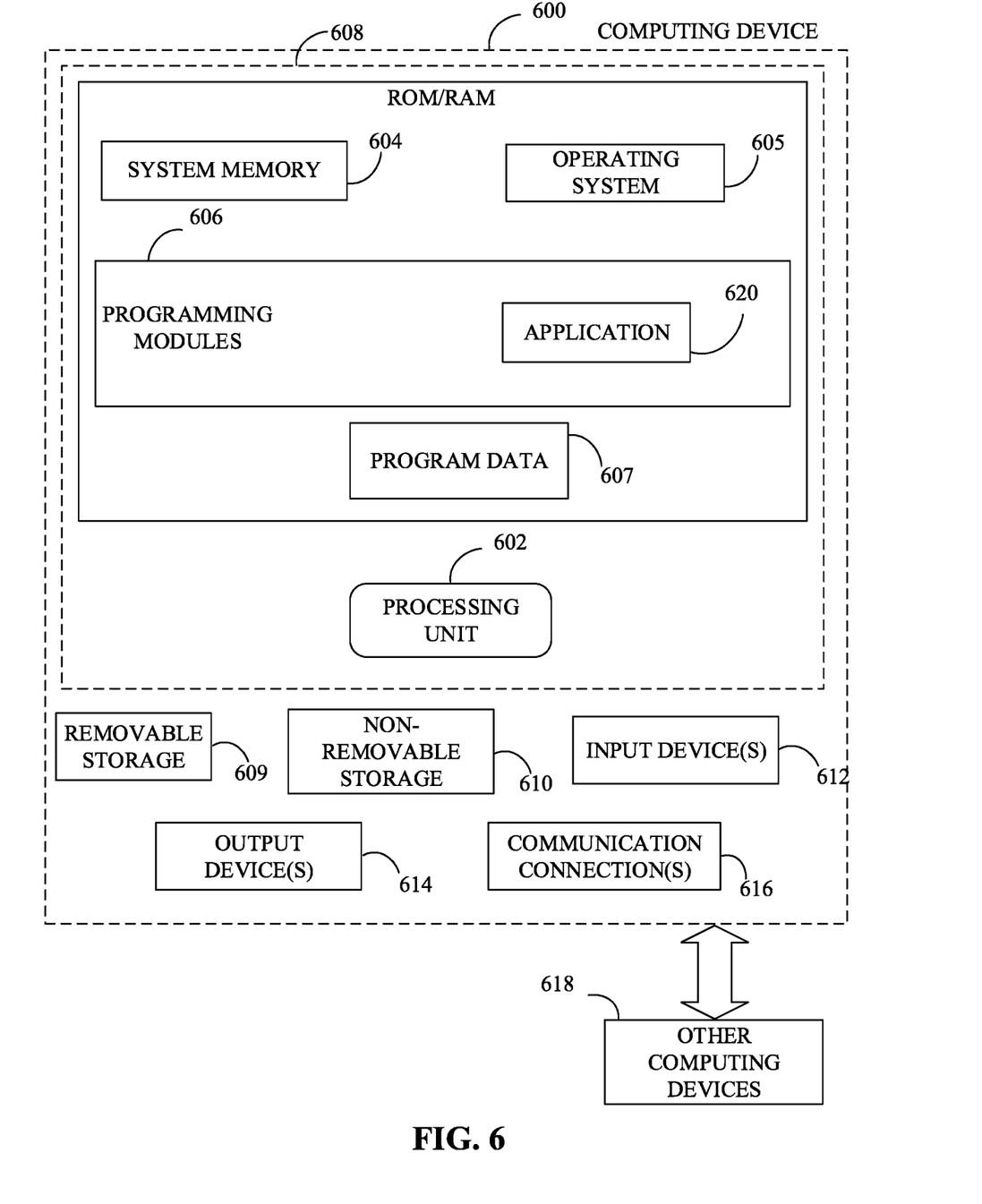
FIG. 6 is a block diagram of a computing device for implementing the methods disclosed herein, in accordance with some embodiments.

With reference to FIG. 6, a system consistent with an embodiment of the disclosure may include a computing device or cloud service, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include the image-processing module, machine learning module. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and non-volatile, removable and non-removable media implemented in any method or technology for storage of information, such as computer-readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, a location sensor, a camera, a biometric sensor, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 604, including operating system 605. While executing on processing unit 602, programming modules 606 (e.g., application 620 such as a media player) may perform processes including, for example, one or more stages of methods, algorithms, systems, applications, servers, databases as described above. The aforementioned process is an example, and processing unit 602 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method of facilitating live streaming of content on multiple social media platforms, the method comprising:
    receiving, using a communication device, a digital content from a source user device, wherein the source user device comprises at least one content capturing device configured for generating the digital content;
    receiving, using the communication device, a supplemental content identifier from the source user device;
    receiving, using the communication device, a plurality of target identifiers from the source user device, wherein the plurality of target identifiers corresponds to a plurality of target user devices;
    identifying, using a processing device, a plurality of social media servers associated with the plurality of target identifiers;
    identifying, using the processing device, a supplemental content based on the supplemental content identifier, wherein the supplemental content comprises at least one of a background audio content, a visual content, an audio-visual content, and a textual content;
    processing, using the processing device, the digital content based on a plurality of platform characteristics corresponding to the plurality of social media servers;
    embedding, using the processing device, the supplemental content in the digital content;
    generating, using the processing device, a plurality of digital content based on the processing; and
    transmitting, using the communication device, the plurality of digital content to the plurality of social media servers.

2. The method of claim 1, wherein the visual content comprises at least one visually consumable content, wherein the at least one visually consumable content comprises a multidimensional image.

3. The method of claim 1, wherein the background audio content comprises at least one aurally consumable content, wherein the at least one aurally consumable content comprises at least one of a music content and a voice content.

4. The method of claim 1, wherein the plurality of target identifiers comprises a plurality of social media platform identifiers corresponding to a plurality of social media platforms, wherein a first target user device of the plurality of target user devices is associated with a first social media platform of the plurality of social media platforms, wherein a second target user device of the plurality of target user devices is associated with a second social media platform of the plurality of social media platforms.

5. The method of claim 1, wherein the plurality of target identifiers comprises a plurality of user identifiers associated with a plurality of social media platforms, wherein a first user identifier of the plurality of user identifiers is associated with a first social media platform of the plurality of social media platforms, wherein a second user identifier of the plurality of user identifiers is associated with a second social media platform of the plurality of social media platforms.

6. The method of claim 1 further comprising:
wherein the plurality of target identifiers comprises at least one location indicator;
analyzing, using the processing device, the digital content; and
determining, using the processing device, the at least one location indicator based on the analyzing.

7. The method of claim 1, wherein the plurality of platform characteristics comprises a plurality of content formats, wherein the processing comprises transforming the digital content into the plurality of digital content based on the plurality of content formats.

8. The method of claim 1 further comprising:
receiving, using the communication device, a plurality of user feedback from the plurality of target user devices;
generating, using the processing device, an integrated user feedback based on the plurality of user feedback; and
transmitting, using the communication device, the integrated user feedback to the source user device, wherein the source user device is configured for presenting the integrated user feedback.

9. The method of claim 1, wherein the at least one content capturing device comprises a plurality of cameras, wherein the plurality of cameras comprises a front camera and a rear camera, wherein each of the front camera and the rear camera is configured to capture content simultaneously.

10. The method of claim 1 further comprising:
transmitting, using the communication device, a plurality of credentials of the user to the plurality of social media servers; and
authenticating, using the processing device, the user with the plurality of social media servers based on the plurality of credentials.

11. A system of facilitating live streaming of content on multiple social media platforms, the system comprising:
a communication device configured for:
receiving a digital content from a source user device, wherein the source user device comprises at least one content capturing device configured for generating the digital content;
receiving a supplemental content identifier from the source user device;
receiving a plurality of target identifiers from the source user device, wherein the plurality of target identifiers corresponds to a plurality of target user devices; and
transmitting a plurality of digital content to a plurality of social media servers;
a processing device configured for:
identifying the plurality of social media servers associated with the plurality of target identifiers;
identifying a supplemental content based on the supplemental content identifier, wherein the supplemental content comprises at least one of a background audio content, a visual content, an audio-visual content, and a textual content;
processing the digital content based on a plurality of platform characteristics corresponding to the plurality of social media servers; embedding the supplemental content in the digital content; and
generating the plurality of digital content based on the processing.

12. The system of claim 11, wherein the visual content comprises at least one visually consumable content, wherein the at least one visually consumable content comprises a multidimensional image.

13. The system of claim 11, wherein the background audio content comprises at least one aurally consumable content, wherein the at least one aurally consumable content comprises at least one of a music content and a voice content.

14. The system of claim 11, wherein the plurality of target identifiers comprises a plurality of social media platform identifiers corresponding to a plurality of social media platforms, wherein a first target user device of the plurality of target user devices is associated with a first social media platform of the plurality of social media platforms, wherein a second target user device of the plurality of target user devices is associated with a second social media platform of the plurality of social media platforms.

15. The system of claim 11, wherein the plurality of target identifiers comprises a plurality of user identifiers associated with a plurality of social media platforms, wherein a first user identifier of the plurality of user identifiers is associated with a first social media platform of the plurality of social media platforms, wherein a second user identifier of the plurality of user identifiers is associated with a second social media platform of the plurality of social media platforms.

16. The system of claim 11, wherein the processing device is further configured for:
wherein the plurality of target identifiers comprises at least one location indicator;
analyzing the digital content; and
determining the at least one location indicator based on the analyzing.

17. The system of claim 11, wherein the plurality of platform characteristics comprises a plurality of content formats, wherein the processing comprises transforming the digital content into the plurality of digital content based on the plurality of content formats.

18. The system of claim 11, wherein the communication device is further configured for:
receiving a plurality of user feedback from the plurality of target user devices; and
transmitting an integrated user feedback to the source user device, wherein the source user device is configured for presenting the integrated user feedback, wherein the processing device is configured for generating the integrated user feedback based on the plurality of user feedback.

19. The system of claim 11, wherein the at least one content capturing device comprises a plurality of cameras, wherein the plurality of cameras comprises a front camera and a rear camera, wherein each of the front camera and the rear camera is configured to capture content simultaneously.

20. The system of claim 11, wherein the communication device is further configured for transmitting a plurality of credentials of the user to the plurality of social media servers, wherein the processing device is configured for authenticating the user with the plurality of social media servers based on the plurality of credentials.

21. A device for facilitating live streaming of content on multiple social media platforms, the device comprising:

at least one content capturing device configured for generating the digital content;

a communication device configured for transmitting a plurality of digital content to a plurality of social media servers; and a processing device communicatively coupled with the at least one content capturing device and the communication device, wherein the processing device is configured for:

identifying the plurality of social media servers associated with a plurality of target identifiers, wherein the plurality of target identifiers corresponds to a plurality of target user devices;

identifying a supplemental content based on a supplemental content identifier, wherein the supplemental content comprises at least one of a background audio content, a visual content, an audio-visual content, and a textual content;

processing the digital content based on a plurality of platform characteristics corresponding to the plurality of social media servers;

embedding the supplemental content in the plurality of digital content; and generating the plurality of digital content based on the processing.

22. The device of claim 21, wherein the visual content comprises at least one visually consumable content, wherein the at least one visually consumable content comprises a multidimensional image.

23. The device of claim 21, wherein the background audio content comprises at least one aurally consumable content, wherein the at least one aurally consumable content comprises at least one of a music content and a voice content.

24. The device of claim 21, wherein the plurality of target identifiers comprises a plurality of social media platform identifiers corresponding to a plurality of social media platforms, wherein a first target user device of the plurality of target user devices is associated with a first social media platform of the plurality of social media platforms, wherein a second target user device of the plurality of target user devices is associated with a second social media platform of the plurality of social media platforms.

25. The device of claim 21, wherein the plurality of target identifiers comprises a plurality of user identifiers associated with a plurality of social media platforms, wherein a first user identifier of the plurality of user identifiers is associated with a first social media platform of the plurality of social media platforms, wherein a second user identifier of the plurality of user identifiers is associated with a second social media platform of the plurality of social media platforms.

26. The device of claim 21, wherein the plurality of platform characteristics comprises a plurality of content formats, wherein the processing comprises transforming the digital content into the plurality of digital content based on the plurality of content formats.

27. The device of claim 21, wherein the processing device is configured for generating an integrated user feedback based on a plurality of user feedback, wherein the device is configured for presenting the integrated user feedback.

28. The device of claim 21, wherein the at least one content capturing device comprises a plurality of cameras, wherein the plurality of cameras comprises a front camera and a rear camera, wherein each of the front camera and the rear camera is configured to capture content simultaneously.

29. The device of claim 21, wherein the processing device is configured for authenticating the user with the plurality of social media servers based on a plurality of credentials of the user.

30. The device of claim 21, wherein the at least one content capturing device is detachably couplable to the device.

* * * * *